No. 681,220. Patented Aug. 27, 1901.
B. C. HICKS.
MOTOR VEHICLE.
(Application filed Oct. 22, 1900.)

(No Model.) 3 Sheets—Sheet 2.

Witnesses:
Inventor,
Bohn C. Hicks,

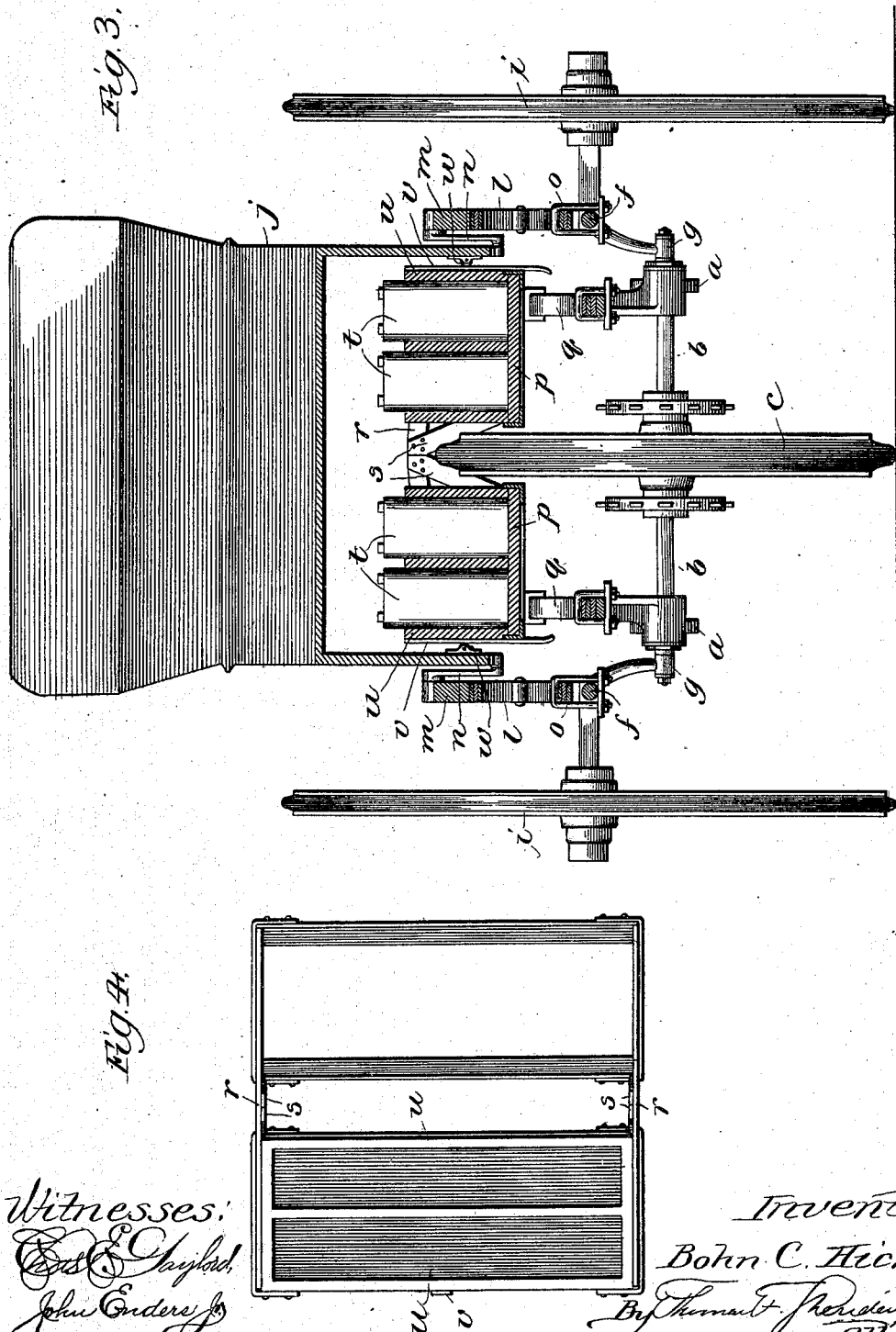

UNITED STATES PATENT OFFICE.

BOHN CHAPIN HICKS, OF CHICAGO, ILLINOIS, ASSIGNOR TO THE HICKS MOTOR CYCLE COMPANY, OF SAME PLACE.

MOTOR-VEHICLE.

SPECIFICATION forming part of Letters Patent No. 681,220, dated August 27, 1901.

Application filed October 22, 1900. Serial No. 33,935. (No model.)

*To all whom it may concern:*

Be it known that I, BOHN CHAPIN HICKS, a citizen of the United States, residing at Chicago, in the county of Cook and State of Illinois, have invented certain new and useful Improvements in Motor-Vehicles, of which the following is a specification.

My invention relates to that class of vehicles known as "motor-vehicles"—that is, vehicles which carry their own propelling force—and particularly to the construction of the running-gear and body thereof, all of which will more fully hereinafter appear.

The principal object of the invention is to make a simple, economical, and efficient motor-vehicle and provide it with a wagon-body made in two parts—the wagon-body proper, which supports the occupants, and the bottom portion—both of which are independently and flexibly mounted; and the invention consists in the features, combinations, and details of construction hereinafter described and claimed.

Figure 1:
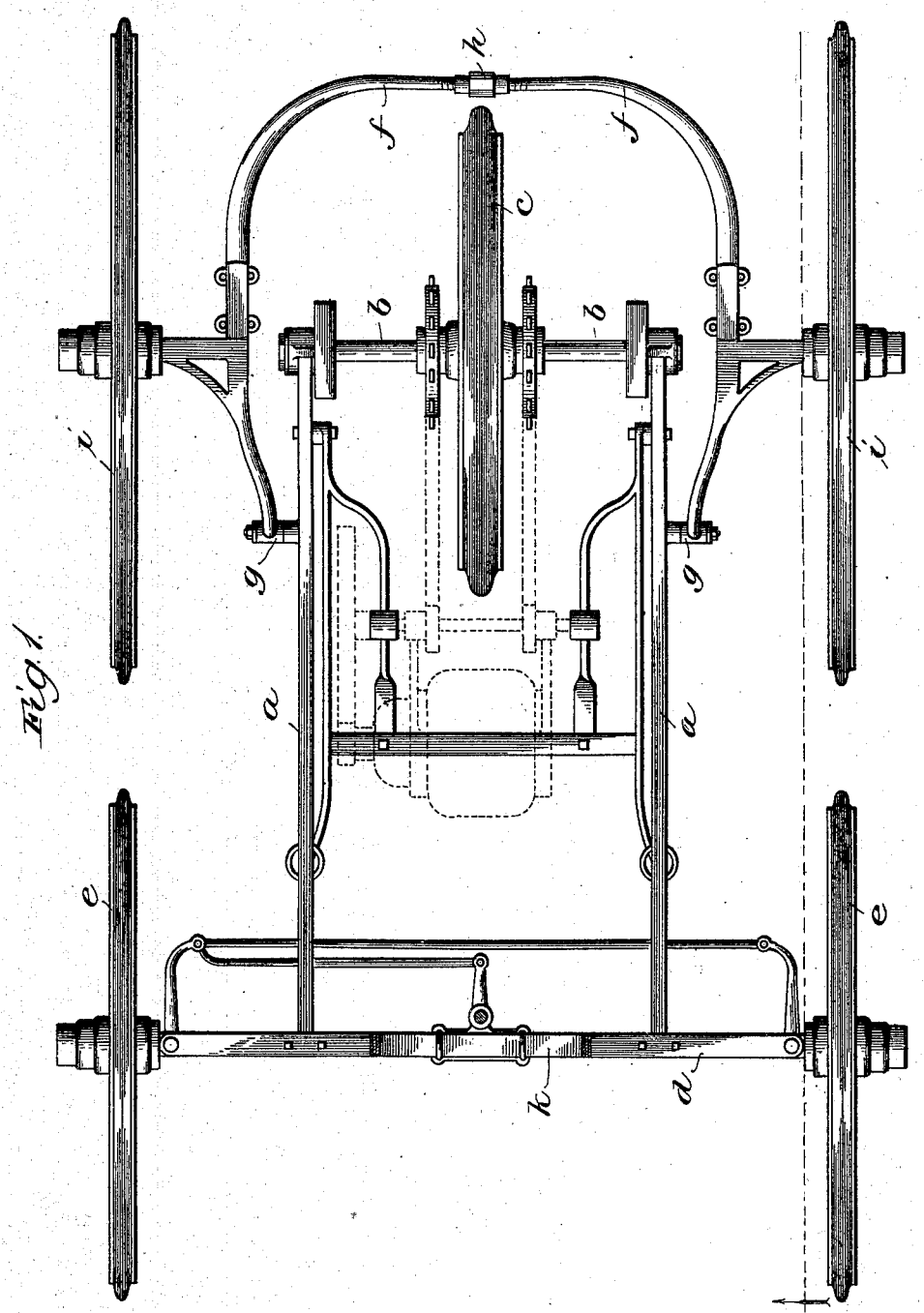
Figure 2:
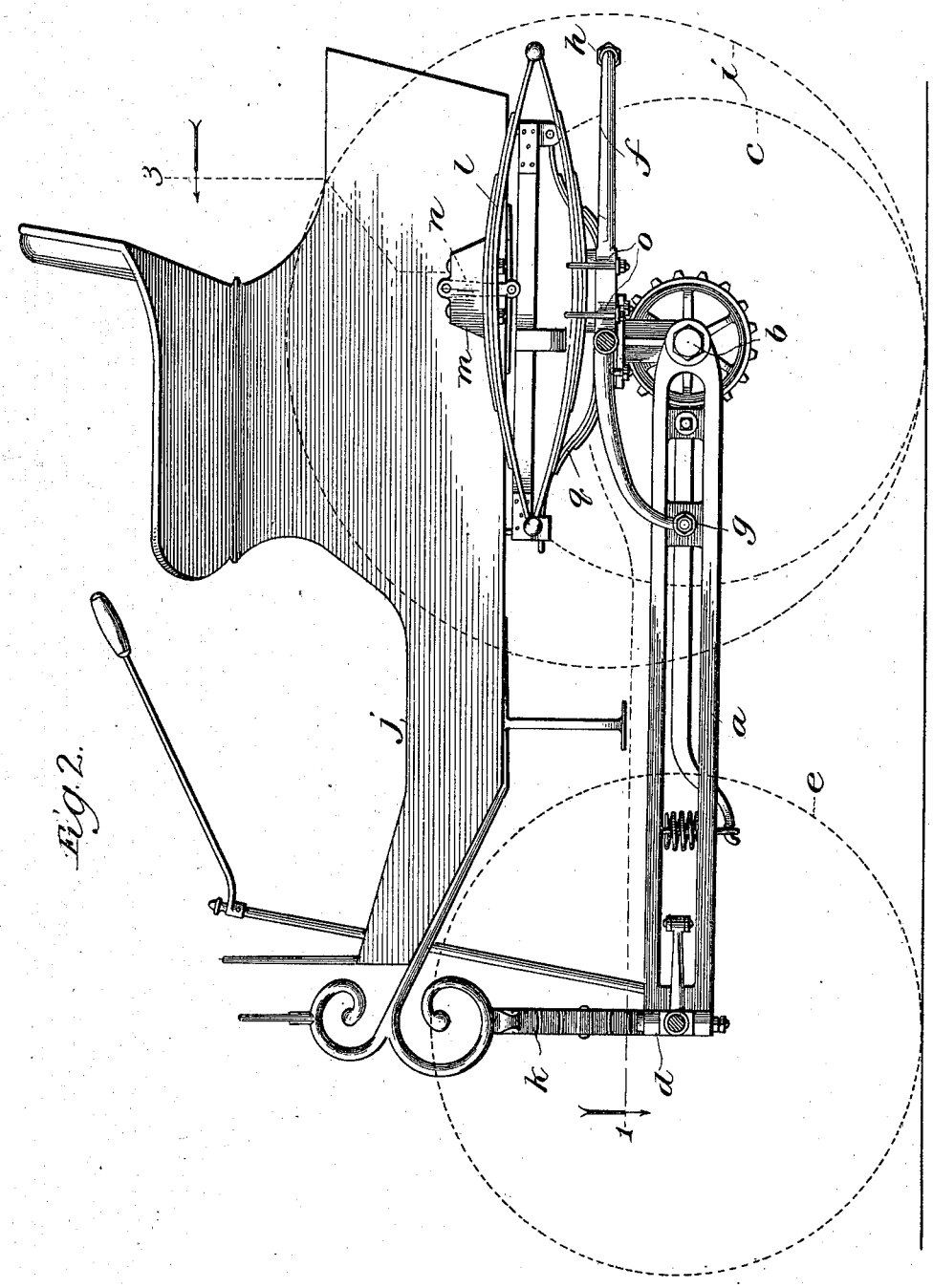

In the accompanying drawings, Figure 1 is a plan view of a running-gear constructed in accordance with these improvements; Fig. 2, a vertical sectional elevation of a vehicle constructed in accordance with my improvements, taken on line 2 of Fig. 1 looking in the direction of the arrow; Fig. 3, a rear end elevation, partly in section, taken on line 3 of Fig. 2 looking in the direction of the arrow; and Fig. 4, a plan view of the independent body-bottom.

In the art to which this invention relates, and particularly in that class of vehicles which has electricity as a propelling force, it is well known that the body portion which supports the occupants also carries the storage batteries and that the weight of such batteries is in the neighborhood of four or five hundred pounds. It is also well known that the weight of such batteries, in addition to that of the occupants, must be supported upon springs, and that for this purpose heavy springs are required, which do not yield to the small obstructions or irregularities of the road and which when yielding to large obstructions swing the body tremendously.

The principal object of the invention therefore is to make a wagon-body in two parts and support such parts flexibly upon the running-gear of the vehicle, all of which will more fully hereinafter appear.

In constructing a vehicle in accordance with these improvements I make what I term a "main frame" $a$, in which is rotatably mounted at the rear end an axle $b$, carrying the driving or traction wheel $c$. This main frame is secured at its front portion to a front axle $d$, which in turn is provided with the usual supporting guiding-wheels $e$, by which the front portion of the vehicle is supported and steered.

It is desirable that rear supporting-wheels be provided and so arranged as to permit the vehicle to take the undulations or irregularities of the road and turn corners in a manner that will minimize the shock or jar and consequent wear of parts. To accomplish this result, a two-part axle $f$ is provided, which is substantially U-shaped when viewed in plan view, as shown in Fig. 1. The free ends of this two-part axle are pivoted to the main frame at $g$ at a point forward of the driving-axle and between it and the front axle and are pivotally joined together at or near the center by means of a union $h$, which has threaded engagement with the right and left hand threads, respectively, on the two-part axle, which permits both portions of the axle to have independent rotations or oscillations in the union. The axle is provided with two side supporting-wheels $i$, arranged in line with and outside of the central traction or driving wheels $c$. It is desirable for various reasons that these wheels be made of larger diameter than the driving-wheel, so as to bring the axes of such wheels above the axis of the driving-wheel, but cause it to remain in the same vertical plane, as shown in Fig. 2. By this arrangement it will be seen that the front wheels may have the independent vertical movement of the other three wheels, and the traction and side supporting-wheels have movements in a vertical plane independent of each other and of the front supporting and guiding wheels, all of which will be appreciated by those skilled in the art.

It is desirable that the wagon-body $j$ be supported in an adjustable as well as yielding manner upon the rear axle particularly, as well as upon the front axle. In order to accomplish this, it is provided with a spring $k$ and yieldingly supported upon the front axle by means thereof. The rear of the body portion is supported upon the two-part rear axle by means of the elliptical springs $l$, placed at each side of and longitudinally parallel with the body portion. As shown in Figs. 2 and 3 particularly, the connection between the elliptical spring, side supporting-springs, and body portion is flexible—that is, the body portion is pivotally connected to the upper portion of the elliptical springs on a block $m$ by means of a link $n$, which is pivotally mounted therein, as well as in the lower portion of the wagon-body. This permits a swinging motion of the body independent of the spring and at the same time permits an adjustment of these elliptical springs upon the two-part axle, as will be more fully hereinafter set forth.

In order to obtain greater flexibility of the vehicle, it is desirable that as light springs as possible be used, and to accomplish this result the wagon-body is made in two parts— the principal portion $j$, above described, which carries the seat to support the occupants, and the part or platform $p$ which forms the bottom of the body portion and is inclosed within the same. This independent "body portion," as I prefer to term it, of the wagon-body is yieldingly supported upon leaf-springs $q$, which are in turn supported upon the driving-axle of the vehicle, so that the springs $l$, which support the wagon-body, and the springs which support the bottom portion thereof may be as light as possible and each act independently of the other. The body-bottom is made in two parts, as is clearly shown in Figs. 3 and 4, connected together by means of the truss $r$ and the struts $s$, and, as shown in the figures, separate to such an extent as to permit the central traction-wheel to pass up and between them. This bottom portion, as shown in Fig. 3, supports a set or sets of storage batteries $t$, though of course it will be understood it can support anything else, such as water-tanks, as may be necessary when used in or about motor-vehicles.

It will of course be understood that as the different parts of the wagon-body have independent motions in a vertical plane there will be considerable rubbing, and to overcome the friction developed by the rubbing of parts or to minimize the same the bottom portion has upwardly-extending sides $u$, provided with wear-strips $v$ on the outside thereof and arranged to contact antifriction-bearings $w$ on the body proper, which antifriction-bearings may be composed of balls or rollers, though I prefer to use rollers. As the body portion proper goes up or down in opposition to the movement of the bottom portion, it will be seen that the balls or antifriction-rollers would minimize the friction which would otherwise be developed between the parts.

It is very desirable that the position of the load of the body upon the rear axle may be adjusted to meet various circumstances and conditions. To accomplish this result, the side supporting elliptical springs are adjustably secured to the rear axle, as shown in Figs. 2 and 3, by means of clips $o$. An inspection of Fig. 2 will show that these clips may be moved longitudinally upon the side portions of the two-part axle, so as to span the axes of the side supporting-wheels or be placed forward or rearward on the same. In the drawings they are shown as placed to the rear of the axes of the side supporting-wheels; but it is evident that either of the other two positions may be obtained by merely loosening the clips and changing the position of the springs thereon, the body of the vehicle being at all times in pivotal connection with the upper portion of the elliptical springs.

The parts shown and described in this specification, but not claimed herein, are reserved for and intended to be claimed in an application or applications to be filed simultaneously herewith, and I do not desire to be understood as abandoning any part or portion of such mechanisms.

I claim—

1. In a vehicle of the class described, a running-gear frame comprising two pivotally-connected independently-movable portions, a body portion supported thereon made in two parts, one part forming the seat proper and the other the bottom portion and each being independently and yieldingly mounted at one end upon a different independently-movable portion of the running-gear frame, substantially as described.

2. In a vehicle of the class described, the combination of a running-gear frame comprising two independently-movable portions, a body portion formed in two parts, one the seat part and the other a bottom part, and spring mechanism independently and yieldingly supporting the two parts each upon a different independently-movable portion of the running-gear frame, substantially as described.

3. In a vehicle of the class described, the combination of a running-gear, a body portion made in two parts—a seat part and a bottom portion inclosed in and by the seat part, spring mechanisms independently and yieldingly supporting the two parts of the body portion upon the running-gear, and antifriction roller or ball mechanism between the two parts of the body portion to minimize the development of frictional force, substantially as described.

4. In a vehicle of the class described, the combination of a running-gear composed of a main frame carrying a central traction-wheel and supporting steering-wheels, a supplementary frame carrying rear supporting-wheels pivotally secured to the main frame, a body portion formed in two parts—one a bottom portion yieldingly supported upon the main frame, and the other containing the seat proper inclosing the bottom portion and yieldingly supported upon the supplementary frame, substantially as described.

5. In a vehicle of the class described, the combination of a running-gear formed of a main frame carrying a central traction driving-wheel and a front steering-wheel, a supplementary frame pivotally secured to the main frame and carrying the rear side supporting-wheels, and a body portion made in two parts, one a seat portion yieldingly supported upon the supplementary frame and the other a bottom portion made in two parts inclosed by the seat portion and spanning the central driving-wheel yieldingly supported upon the main frame, substantially as described.

6. In a vehicle of the class described, the combination of a running-gear formed of a main frame carrying a central traction driving-wheel and a front steering-wheel, a supplementary frame pivotally secured to the main frame and carrying the rear side supporting-wheels, a body portion made in two parts—one a seat portion yieldingly supported upon the supplementary frame and the other a bottom portion made in two parts inclosed by the seat portion and spanning the central driving-wheel yieldingly supported upon the main frame, and antifriction-bearings interposed between the two parts of the body portion, substantially as described.

BOHN CHAPIN HICKS.

Witnesses:
THOMAS F. SHERIDAN,
ANNIE C. COURTENAY.